United States Patent [19]
Brooks et al.

[11] Patent Number: 6,148,263
[45] Date of Patent: Nov. 14, 2000

[54] ACTIVATION OF WELL TOOLS

[75] Inventors: James E. Brooks, Manvel; Nolan C. Lerche, Stafford; Gerald W. Robertson; Michael L. Timmons, both of Missouri City, all of Tex.

[73] Assignee: Schlumberger Technology Corporation, Sugar Land, Tex.

[21] Appl. No.: 09/179,511

[22] Filed: Oct. 27, 1998

[51] Int. Cl.$^7$ .................................................. G06F 19/00
[52] U.S. Cl. ............................................................. 702/6
[58] Field of Search ................................ 702/9–13, 6–8; 102/215, 206, 218

[56] References Cited

U.S. PATENT DOCUMENTS

| | | |
|---|---|---|
| 3,181,463 | 5/1965 | Morgan et al. . |
| 3,327,791 | 6/1967 | Harrigan, Jr. . |
| 3,366,055 | 1/1968 | Hollander, Jr. . |
| 3,517,758 | 6/1970 | Schuster . |
| 3,640,224 | 2/1972 | Petrick et al. . |
| 3,640,225 | 2/1972 | Carlson et al. . |
| 3,978,791 | 9/1976 | Lemley et al. . |
| 4,137,850 | 2/1979 | Donner .................................. 102/215 |
| 4,307,663 | 12/1981 | Stonestrom . |
| 4,393,779 | 7/1983 | Brede et al. . |
| 4,421,030 | 12/1983 | DeKoker . |
| 4,422,381 | 12/1983 | Barrett . |
| 4,441,427 | 4/1984 | Barrett . |
| 4,471,697 | 9/1984 | McCormick et al. . |
| 4,517,497 | 5/1985 | Malone . |
| 4,527,636 | 7/1985 | Bordon . |
| 4,592,280 | 6/1986 | Shores . |
| 4,602,565 | 7/1986 | MacDonald et al. . |
| 4,632,034 | 12/1986 | Colle, Jr. . |
| 4,638,712 | 1/1987 | Chawla et al. . |
| 4,662,281 | 5/1987 | Wilhelm et al. . |
| 4,700,629 | 10/1987 | Benson et al. . |
| 4,708,060 | 11/1987 | Bickes, Jr. et al. . |
| 4,729,315 | 3/1988 | Proffit et al. . |
| 4,735,145 | 4/1988 | Johnson et al. . |
| 4,762,067 | 8/1988 | Barker et al. . |
| 4,777,878 | 10/1988 | Johnson et al. . |
| 4,788,913 | 12/1988 | Stroud et al. . |
| 4,831,933 | 5/1989 | Nerheim et al. . |

(List continued on next page.)

FOREIGN PATENT DOCUMENTS

| | | |
|---|---|---|
| 0 029 671 | 9/1983 | European Pat. Off. . |
| 0 601 880 A2 | 6/1994 | European Pat. Off. . |
| 0 604 694 A1 | 7/1994 | European Pat. Off. . |
| 677824 | 8/1952 | United Kingdom . |
| 693164 | 6/1953 | United Kingdom . |
| 2118282 | 10/1983 | United Kingdom . |
| 2100395 | 8/1984 | United Kingdom . |
| 2190730 | 11/1987 | United Kingdom . |
| 2226872 | 7/1990 | United Kingdom . |
| 2265209 | 9/1993 | United Kingdom . |
| 2290855 | 1/1996 | United Kingdom . |
| WO 96/23195 | 8/1996 | WIPO . |
| WO98/38470 | 9/1996 | WIPO . |

OTHER PUBLICATIONS

"Performance Criteria for Small Slapper Detonators" Controller, Her Majesty's Stationery Office, London 1984.

"New Developments in the Field of Firing Techniques" by K. Ziegler Propellants, Explosives, Pyrotechnics 12, 115–120 (1987).

(List continued on next page.)

*Primary Examiner*—Donald E. McElheny, Jr.
*Attorney, Agent, or Firm*—Trop Pruner & Hu P.C.

[57] ABSTRACT

A safety system for use with an apparatus lowered into a well includes a power supply and a controller that monitors at least a predefined condition of the apparatus. A switch blocks power from the apparatus until the predefined condition is present. A test system includes a test device that generates a signal having a predetermined characteristic (a certain frequency, for example). A controller detects the signal and enables performance of a test operation when the signal of the predetermined frequency is present.

23 Claims, 8 Drawing Sheets

U.S. PATENT DOCUMENTS

| | | |
|---|---|---|
| 4,843,964 | 7/1989 | Bickes, Jr. et al. . |
| 4,886,126 | 12/1989 | Yates, Jr. ................................ 175/4.54 |
| 4,944,225 | 7/1990 | Barker . |
| 5,088,413 | 2/1992 | Huber et al. . |
| 5,094,166 | 3/1992 | Hendley, Jr. . |
| 5,094,167 | 3/1992 | Hendley, Jr. . |
| 5,172,717 | 12/1992 | Boyle et al. . |
| 5,347,929 | 9/1994 | Lerche et al. . |
| 5,413,045 | 5/1995 | Miszewski ............................. 102/201 |
| 5,505,134 | 4/1996 | Brooks et al. . |
| 5,520,114 | 5/1996 | Guimard et al. . |
| 5,539,636 | 7/1996 | Marsh et al. .............................. 702/79 |
| 5,706,892 | 1/1998 | Aeschbacher, Jr. et al. . |
| 5,756,926 | 5/1998 | Bonbrake et al. ...................... 102/215 |

OTHER PUBLICATIONS

"Application of Slapper Detonator Technology to the Design of Special Detonation Systems," by W. H. Meyers Proc. $12^{th}$ Symposium on Explosives and Pyrotechnics, San Diego, California, Mar. 13–15, 1984, Detonation Systems Development, Los Alamos National Laboratory, pp. 4–5 through 4–19.

"CP DDT Detonators: II. Output Characterization," by M. L. Lieberman Sandia National Laboratories Report SAND 83–1893, Albuquerque, New Mexico, pp. 3–105 through 3–112.

"A Fast, Low Resistance Switch for Small Slapper Detonators," by D. D. Richardson and D. A. Jones Department of Defence Materials Research Laboratories Report MRL–R–1030, Victoria, Australia.

"The Effect of Switch Resistance on the Ringdown of a Slapper Detonator Fireset," by D. D. Richardson Department of Defence Materials Research Laboratories Report MRL–R–1004, Victoria, Australia.

"Flyer Plate Motion and Its Deformation During Flight," by H. S. Yadav and N. K. Gupta Int. J. Impact Engng, vol. 7, No. 1, 1988, pp. 71–83.

"Mossbauer Study of Shock–Induced Effects in the Ordered Alloy $Fe_{50}Ni_{50}$ In Meteorites," By R. B. Scorzelli, I. S. Azevedo, J. Danon and Marc A. Meyers J. Phys. F: Met. Phys. 17 (1987), pp. 1993–1997.

"Effect of Shock–Stress Duration on the Residual Structure and Hardness of Nickel, Chromel, and Inconel," by L. E. Murr and Jong–Yuh Huang Materials Science and Engineering, 19 (1975), pp. 115–122.

Critical Energy Criterion for the Shock Initiation of Explosives by Projectile Impact, by H. R. James Propellants, Explosives, Pyrotechnics 13, (1988), pp. 35–41.

"High–Temperature–Stable Detonators," by R. H. Dinegar Proc. $12^{th}$ Symposium on Explosives and Pyrotechnics, San Diego, California, Mar. 13–15, 1984, Los Alamos National Laboratory, pp. 4–1 through 4–4.

"Exploding Metallic Foils for Slapper, Fuse, and Hot Plasma Applications: Computational Predictions, Experimental Observations," by I. R. Lindemuth, J. H. Brownell, A. E. Greene, G. H. Nickel, T. A. Oliphant and D. L. Weiss, Thermonuclear Applications Group, Applied Theoretical Physics Division, and W. F. Hemsing and I. A. Garcia, Detonation Systems Group, Dynamic Testing Division, Los Alamos National Laboratory, Los Alamos, New Mexico, pp. 299–305.

"A New Kind of Detonator—The Slapper," by J. R. Stroud Lawrence Livermore Laboratory, University of California, Livermore, California, pp. 22–1 through 22–6.

"Pyrotechnic Ignition in Minislapper Devices," by D. Grief and D. Powell Awre, Aldermaston, Reading RG7 4PR, Berkshire, England, Controller, HMSO, London, 1981, pp. 43–1 through 43–10.

"Exploding Foils—The Production of Plane Shock Waves and the Acceleration of Thin Plates," by D. V. Keller & J. R. Penning, Jr. The Boeing Company, Seattle, Washington, pp. 263–277.

"Acceleration of Thin Plates by Exploding Foil Techniques," by A. H. Guenther, D. C. Wunsch and T. D. Soapes Pulse Power Laboratory, Physics Division, Research Directorate Air Force Special Weapons Center, Kirtland Air Force Base, New Mexico, pp. 279–298.

"A Low–Energy Flying Plate Detonator," by A. K. Jacobson Sandia National Laboratories Report, SAND 81–0487C, Albuquerque, New Mexico, 1981, pp. 49–1 through 49–20.

"Sequential Perforations in Boreholes," by H. Lechen ANTARES Datensysteme GmbH, Jan. 1998.

"A Simple Method for Estimating Well Productivity," by J. E. Brooks. SPE European Formation Damage Conference, The Hague, The Netherlands, Jun. 2–3, 1997.

"Unique Features of SCBs," by P. D. Wilcox and "SCB Explosive Studies" by R. W. Bickes, Jr. Initiating and Pyrotechnic Components Division 2515.

6,148,263

ACTIVATION OF WELL TOOLS

BACKGROUND

The invention relates to operation of well tools.

Oil field perforation and fracturing operations typically involve the use of explosives deployed downhole in gun systems. These explosively powered perforating systems, including bullet guns and shaped-charge perforators, when activated generate a geometrical pattern of perforations through casing and a cement sheath in the well and into the formation. Depending on the desired length and number of perforation zones, one or more gun strings of varying lengths are assembled and conveyed downhole on wireline, tubing, or coiled tubing.

A perforating apparatus typically comprises a gun section housing explosive and perforating devices and a firing head section housing a detonator. Typical explosive devices involved in perforating operations include shaped charges, detonating cords, detonators and powder charges. Detonators are classified as either electro-explosive devices (EEDs) or percussive devices. Percussive detonators are actuated by impact of a firing pin similar to the firing pin of a common rifle or handgun.

In penetrating guns armed with EEDs, inadvertent firing may occur at the surface because of (1) accidental application of electrical power to the gun, either as a pre-run check ("hot check") or in troubleshooting a misfired gun after recovery from the well; (2) entry of stray voltages from the wellsite into a faulty system; or (3) installation of a cable head onto an armed gun while power is applied to the cable.

Although safety procedures have been set up to prevent accidental firing, deviations from safe practices have resulted in injury to persons and damage to equipment. Typical safety procedures may include the following: (1) checking for voltage between a rig, casing, and cable armor before gun arming or disarming, and eliminating such voltage at the source; (2) installing grounding cables between the rig, casing and perforating unit; (3) avoiding the possibility of static potentials by not operating in electrical, dust or snow storms; (4) evacuating all nonessential personnel from the area; (5) eliminating radio-frequency hazards; and (6) disabling or isolating the perforating unit power system during gun arming and until the gun string is at least a certain distance into the well below ground level. Other safety procedures may also be implemented.

One major area of safety concern occurs at the surface prior to running the armed perforators downhole. After a tool string is assembled on the surface, a "hot check" or other surface test may be performed to verify the electrical integrity of the tool string and wireline. A hot check verification includes applying power to the tool string, confirming proper wiring connections and no leakage. The hot check test can be safely made only if the perforating gun is not connected to the wireline. Likewise, another important safety concern is ensuring that shooting power is not applied during the retrieval of a misfired gun.

Furthermore, it is also desirable to avoid detonation of the perforating gun until the gun string is placed in the desired location downhole and until all other desired operating parameters are met. Thus, a need exists for an improved safety system and technique to reduce accidents when handling perforating guns explosive devices, or other well tools.

SUMMARY

In general, according to one embodiment, the invention features a test system having a test device that generates a signal having a predetermined characteristic. A controller detects the signal and enables performance of a test operation when the signal of the predetermined characteristic is present.

In general, according to another embodiment, the invention features a safety system for use with an apparatus lowered into a well. The safety system includes a power supply and a controller that monitors at least a predefined condition of the apparatus. A switch blocks power from the apparatus until the predefined condition are present.

Other features will become apparent from the following description and from the claims.

DETAILED DESCRIPTION

Figure 1:
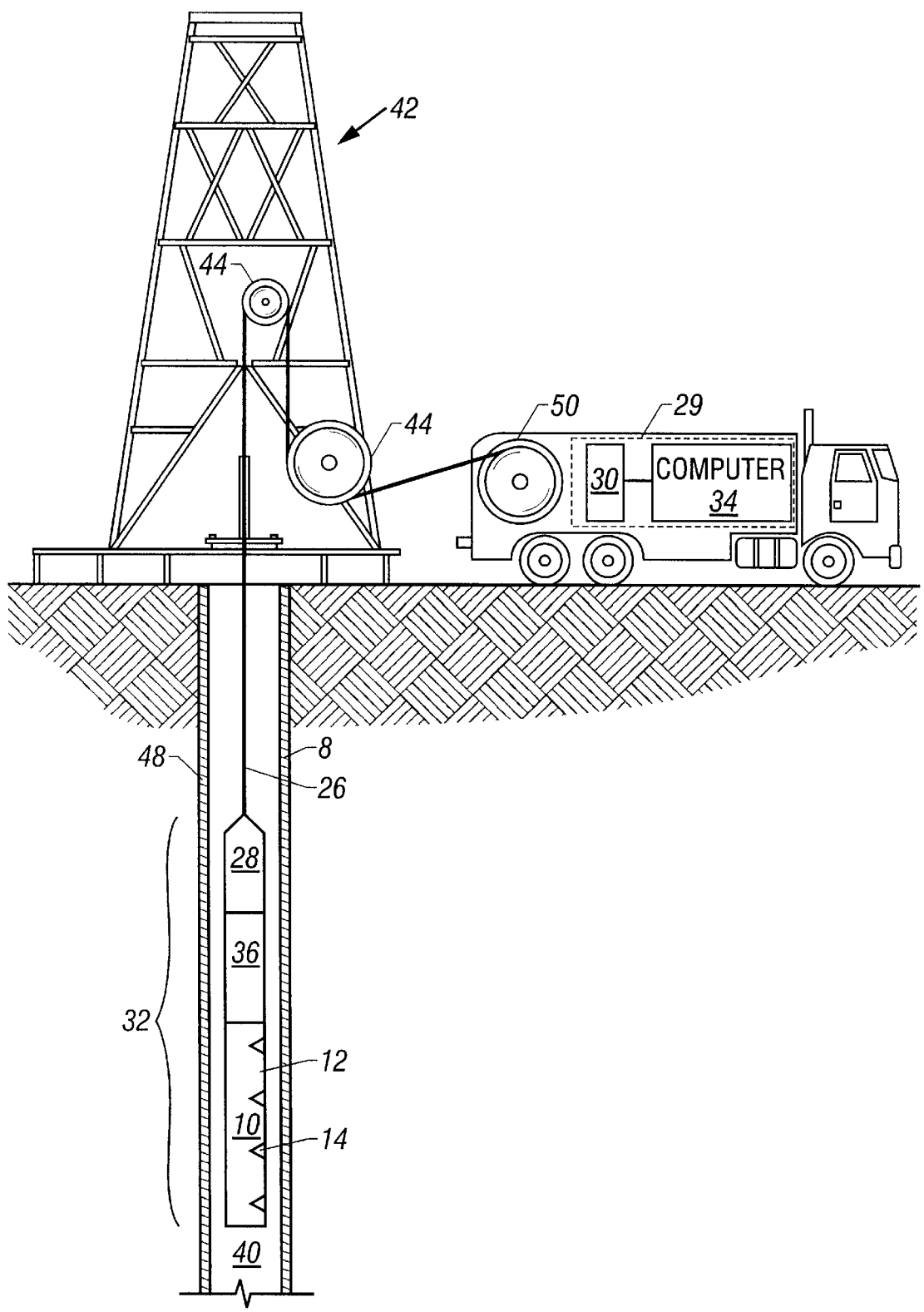
FIG. 1 is a diagram of a perforating string and a computer-controlled safety system according to an embodiment of the invention.

Referring to FIG. 1, example equipment associated with a well 8 includes a safety system 29 according to an embodiment of the invention and a perforating string 32 (or other tool) that may include a shaped-charge perforator gun 10. A typical perforating gun may include a conveyance or carrier 12, shaped charges 14 housed in the carrier 12, a detonating cord, and a detonator. The detonator is fired electrically over an electrical cable 26 (e.g., a wireline), to fire the perforating gun 10. The electrical cable 26 is connected to a cable head 28, which in turn may be connected to a casing collar locator (CCL) 36 that is coupled to the perforating gun 10. Casing 48 may be cemented to the inner wall of the wellbore 40.

The perforating string 32 (or other tool string) typically is lowered into the wellbore 40 by wellhead equipment 42. The electrical cable 26 connected to the tool string is initially loaded on a drum 50, with the electrical cable 26 run through a sheave 44. Activation of the perforating string 32 may be controlled by a computer system 34 located at the well surface in the safety system 29. To prevent accidental firing of the perforating gun 10 and further to perform one or more surface checks of the perforating gun 10 before it is lowered downhole, the computer system 34 works with interface circuitry 30 (also part of the safety system 29) to ensure safe operations.

In some embodiments, the computer system 34 in the safety system 29 prevents electrical activation of the perforating gun 10 until certain conditions and parameters are met, as described below. Further, the computer system 34 may also be configured to more safely perform certain types of surface checks of the perforating gun 10 after it is assembled on the surface.

Figure 2:
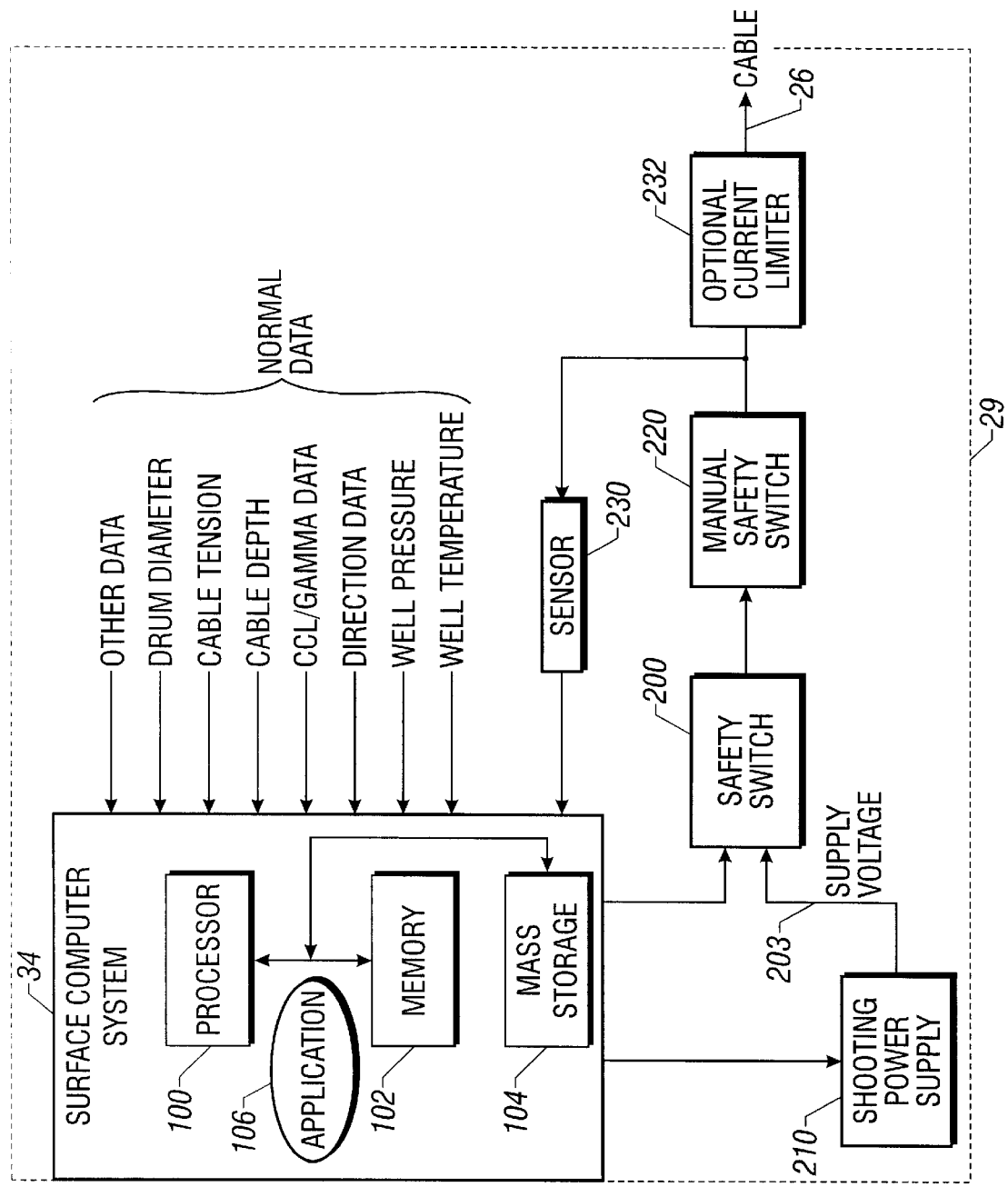
FIG. 2 is a block diagram of a safety system according to an embodiment of the invention.

Referring now to FIG. 2, the safety system 29 according to an embodiment of the invention for improving the safety of well operations and the deployment of well tools is illustrated. The computer system 34, located at the surface of the well 18, may include a processor 100, a memory 102, and application programs stored in the memory 102 and executed by the processor 100. Also included in the computer system 34 may be one or more mass storage devices 104, such as hard disk drives, CD or DVD drives, floppy disk drives, or other suitable media. The application programs running in the computer system 34 include a tool arming application program (implemented in one or more modules) generally represented as 106.

In one embodiment, the tool arming application program 106 has generally two modes of operation: a surface check mode and downhole arming mode. In the surface check mode, the tool arming program 106 is configured to perform surface checks, including a "hot check" to ensure electrical integrity of the electrical cable 26. In the downhole arming mode, the tool arming program 106 may monitor one or more data inputs received by the computer system 34 to control safe activation of the perforating gun 10 or other tool. Some of the data monitored include tool or cable depth into the wellbore 40 (measured by a depth wheel sensor located on wire sheave 44, for example); cable tension as a function of tool depth (cable tension increases with increasing depth); wellbore location measured by the casing collar locator 36 (CCL) or a gamma tool that is an active source that measures the profile of the environment and casing 48; direction of cable travel (indicating whether the tool is being run into the well or is tripping out of the well); travel speed of the cable 26; diameter of the cable in the drum 50 (to determine how much cable 26 has been spooled); well temperature; well pressure; and other data (including whether a cable tester is connected and tests have passed).

The tool arming application program 106 monitors the input data for certain predefined conditions before it activates an electronic safety switch 200. The electronic safety switch 200 is located downstream from a power source 210 for the cable 26. In the illustrated embodiment, the electronic safety switch 200 is upstream of a manual safety switch 220. The surface computer 34 controls the electronic safety switch 200 and maintains it in an open condition to prevent the delivery of a shooting power voltage over line 203 from the power source 210 to the manual safety switch 220 until the monitored input data condition or conditions are satisfied. The conditions monitored by the surface computer 34 may be used to determine that the perforating gun 10 or other tool is downhole and in a safe and desired position before power is provided to the cable 26. Although the electronic safety switch 200 prevents application of shooting power (which involves high voltages), it does allow a relatively low supply voltage to be supplied to the electrical cable 26 to allow the computer system 34 to check for existence of a cable tester to perform surface checks.

In one embodiment, the electronic switch 200 may be implemented in software in the tool arming program 106 so that an "open" position refers to the program 106 disabling certain aspects of the power supply 210 and a "closed" position refers to full enabling of power. In another embodiment, the electronic switch may be implemented with circuitry that is controllable to route power to the cable 26.

After the tool arming program 106 in the computer system 34 has confirmed that the gun 10 is in a safe location downhole, the electronic safety switch 200 is closed to allow shooting power current from the power supply 210 to reach the manual safety switch 220. The electronic safety switch 200 thus provides a mechanism for safely regulating the availability of shooting power to the gun independent of whether the manual switch 220 is in the "open" safety position or the "closed" shooting position. Only when both the electronic safety switch 200 and the manual switch 220 are in the "closed" positions can shooting power be provided from the source 210 to the cable 26 to achieve tool activation.

Prior to running a tool downhole, the well operator may perform surface tests, including a hot check of the electrical system in the electrical cable 26 by applying power to the cable 26 to verify that it is properly connected and functioning (e.g., no current leaks). To avoid accidental detonation of perforating guns or activation of other tools that present a safety hazard during the surface test, the tools are not attached to the cable 26 during testing. The surface test is performed by connecting a cable tester 250 (FIG. 3A) to the tool string in place of the actual tool (e.g., the perforating gun 10) and running the test. Since a hot check is performed on the surface, the tool arming program 106 in the computer system 34, according to embodiments of the invention, interprets such a "surface" condition as being an "unsafe" condition for application of shooting power to the cable 26. To enable surface tests, the tool arming program 106 checks to ensure that the cable tester 250 is attached (by monitoring for a signal having a predetermined signature generated in the cable tester) before electrical power may be applied to the cable 26 to perform the surface tests.

Optionally, to limit the amount of current that may be generated in the electrical cable 26, a current limiting module 232 may be added in series with the electrical cable 26, such as downstream of the manual safety switch 220 illustrated in FIG. 2. The current limiting module 232 limits the maximum current in the cable 26 to a predetermined value that is well below the current needed to detonate a detonating device such as a blasting cap. An example value may be about 110 mA.

Figure 8:
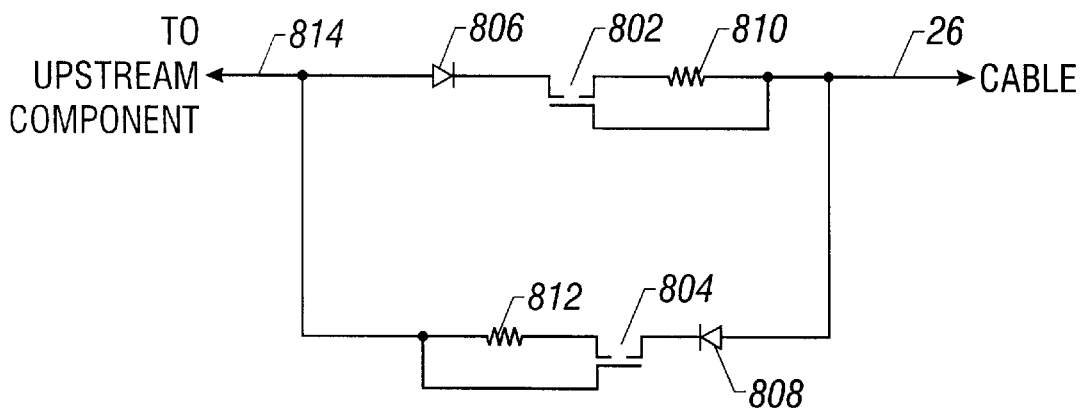
FIG. 8 is an example of the current limiting module 232.

FIG. 8 illustrates an example of how the current limiting module 232 may be implemented. Two depletion mode field effect transistors (FETs) 802 and 804 are normally on. The FET 802 has a drain coupled to the cathode of a diode 806 and a source coupled to one side of a resistor 810.

The gate of the FET 802 is coupled to the other side of the resistor 810, and the anode of the diode 806 is coupled to a line 814 connected to an upstream component. The FET 804 is similarly coupled to a diode 808 and a resistor 812, except that the anode of the diode 808 is coupled to the electrical cable 26 and the other side of the resistor 812 is coupled to the line 814.

The depletion FETs 802 and 804 are pinched off at a set value as determined by the resistance of resistors 810 and 812 and the cable current. The FET 802, diode 806, and resistor 810 control the maximum allowable positive current (current flowing down the cable 26) and the FET 804, diode 808, and resistor 812 control the maximum allowable negative current (current flowing up the cable 26).

The safety system 30 further includes a signal sensor 230 that is used to detect the signal having a predetermined signature that is transmitted over the wireline 26, which in one embodiment may be an AC signal having a predetermined frequency. As noted above, to enable generation of the signature signal in the cable tester 250, a low voltage is supplied by the electronic safety switch 200 down the electrical cable 26. If the signal of the predetermined signature is received, the signal sensor 230 (which includes analog-to-digital or A/D converters) sends an indication to the computer 34 to cause the computer system 34 to close the electronic safety switch 200 so that full power can be supplied to the cable 26 to perform a hot check operation at the well surface.

As an example, if a surface test is requested, power provided down the cable 26 may be set at a certain percentage (e.g., 40%) of the maximum, so that only a low voltage (e.g., 15 VDC) and low current (e.g., 30 mA) are provided down the cable 26. If the signature signal is detected, then full power may be allowed through the electronic safety switch 200.

Figure 3A:
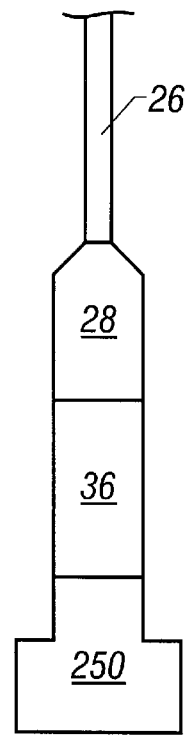
FIG. 3A is a diagram of a cable tester coupled to an electrical cable.
Figure 3B:
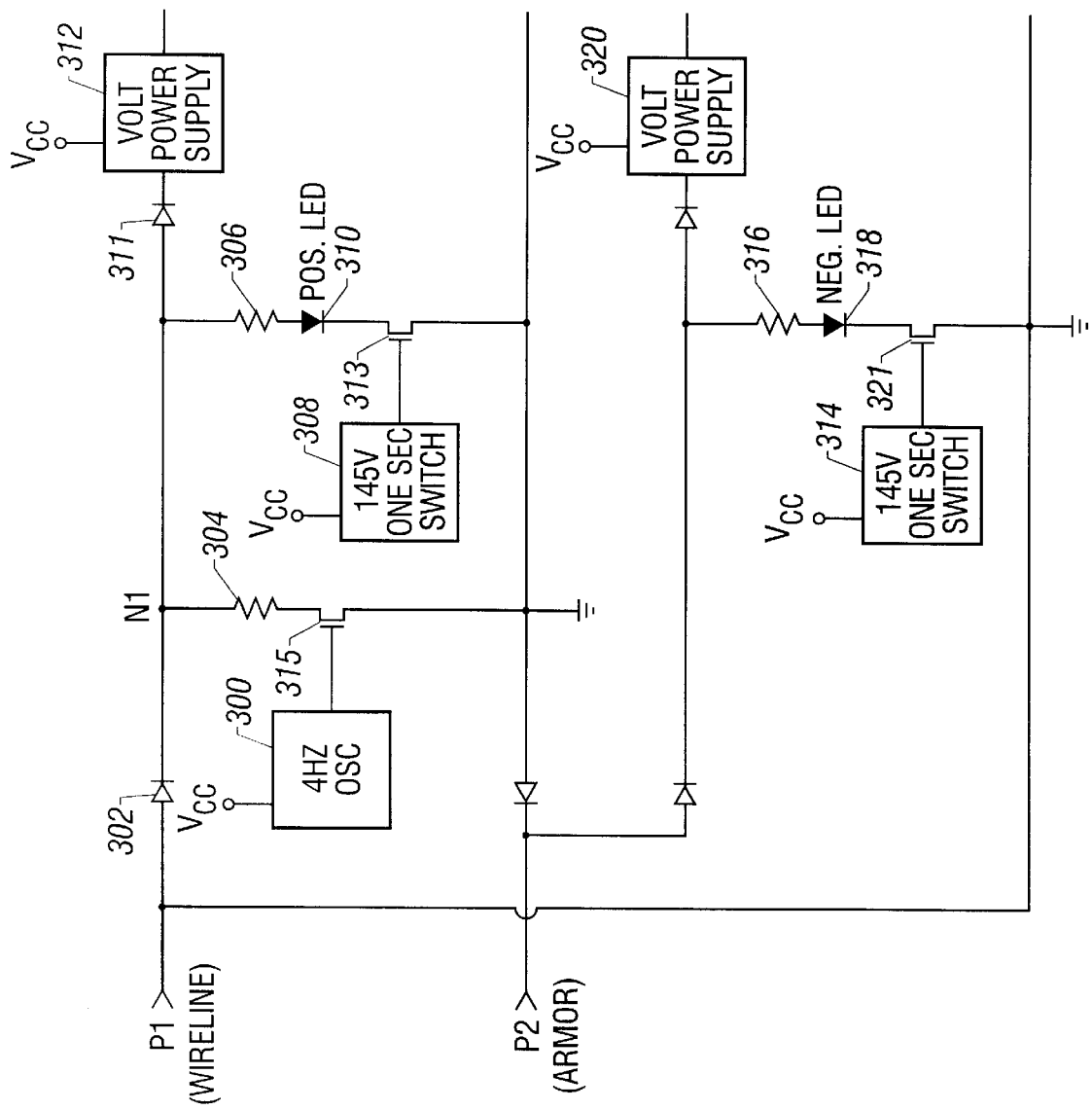
FIG. 3B is a block diagram of components in the cable tester used in the safety system of FIG. 2.

Referring to FIG. 3A, the cable tester 250 according to one embodiment is shown connected to the CCL 36 in place of the perforating gun 10. Referring further to FIG. 3B, the signal having the predetermined signature is generated in the cable tester 250 according to one embodiment by an oscillator 300 that generates a signal having a predetermined low frequency (e.g., between about 3.2 and 4.8 Hz). The output of the oscillator 300 is connected to the gate of a field effect transistor (FET) 315, which is connected in series with a resistor 304 between a node N1 and ground. The node N1 alternates between ground voltage and the voltage of power regulator (that includes a diode 311 and a power supply 312) in response to the oscillating signal supplied to the gate of the FET 315. The power regulator is connected to a supply voltage Vcc provided by the surface power supply 210. The oscillating current signal is electrically coupled to the electrical cable 26 through a diode 302.

In the illustrated embodiment, the signal having the predetermined frequency is selected such that it is a signal that does not occur in nature. The signature signal may be analog or digital signals, multiplexed signals, pulse-width or frequency modulated signals, identifiable pulses, or some combination of these signals. Detection of the oscillating signal of predetermined frequency is used to confirm that the gun is not connected to the cable 26, that the cable tester 250 is connected instead, and that a hot check operation can be conducted. Alternatively, as another example, the signature signal may be a digital signal having a bit pattern to create a unique signature.

Figure 4:
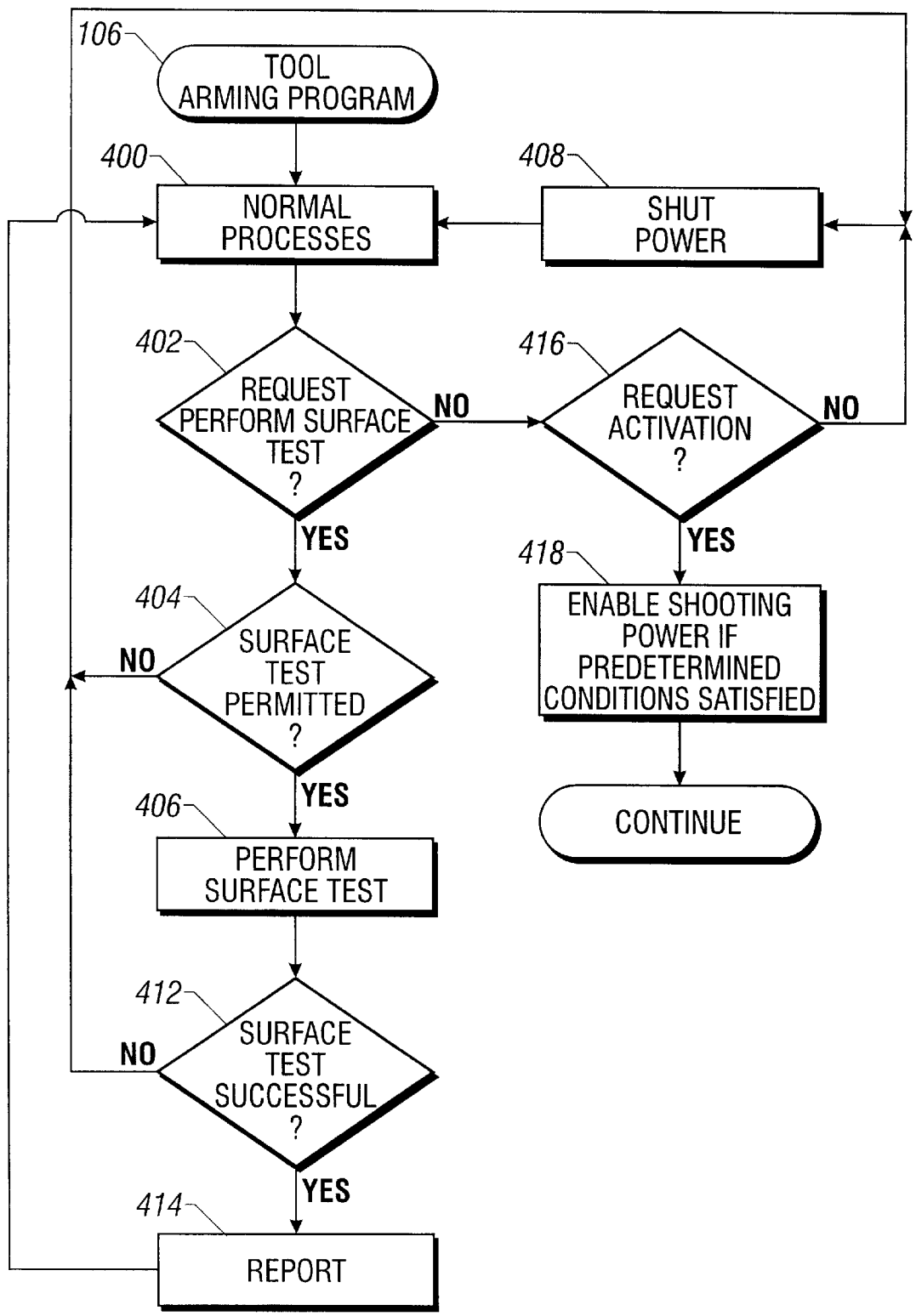
FIG. 4 is a flow diagram of a tool arming application program of one embodiment running in the safety system.

Referring to FIG. 4, portions of the flow of the tool arming application program 106 according to an embodiment of the invention is illustrated. After the tool arming application 106 performs its normal processes (at 400), including initialization and set up, it checks to determine if a surface test is requested (at 402). If so, the program 106 checks to determine if the surface test is permitted (at 404) by determining if the cable tester 250's signature is present as detected through the signal sensor 230.

If a surface test (e.g., hot check) is requested and permitted, the application program 106 first causes the computer system 34 to control the power supply 210 to increase the voltage (Vcc) to the oscillator 300 until an oscillating signal is detected. If an oscillating signal is not detected, the cable tester 250 is either not connected, connected with reversed polarity, or not functional. If so, then the surface test is not allowed and the test is aborted by shutting the power off (at 408). However, if the oscillating signal having the predetermined signature (e.g., frequency between 3.2 and 4.8 Hz) is detected, then the surface test may be performed (at 406), as further described in connection with FIGS. 5A and 5B.

Once the signature of the cable tester 250 is detected, the site engineer may safely perform the surface test by allowing the program 106 to control the application of applying the desired voltage from the surface power supply 210. In one embodiment, when the cable tester signature is recognized, the tool arming program 106 in the computer controls the power supply 210 to provide the appropriate amount of voltage to be applied to the cable 26 during the surface test.

Next, if the surface test is successful (as determined at 412), then a report of the successful test is generated (at 414) and the tool arming program 106 continues with normal processes (at 400). Otherwise, if the surface test was unsuccessful, then the error is reported and power is shut off (at 408).

The surface computer 34 may be programmed to initiate the desired application of power for the surface test for a limited duration, the application duration preferably being on the order of only a few seconds, after which time, the surface computer 34 opens the electronic safety switch 200 to the safe position and may prompt the engineer to open the manual safety switch 220. Also, if the cable tester 250 is disconnected or removed from the cable 26 (either inadvertently or intentionally), then the cable tester signature connection signal is terminated and the electronic safety switch 200 immediately reverts back to the open (safety) position.

Figure 5A:
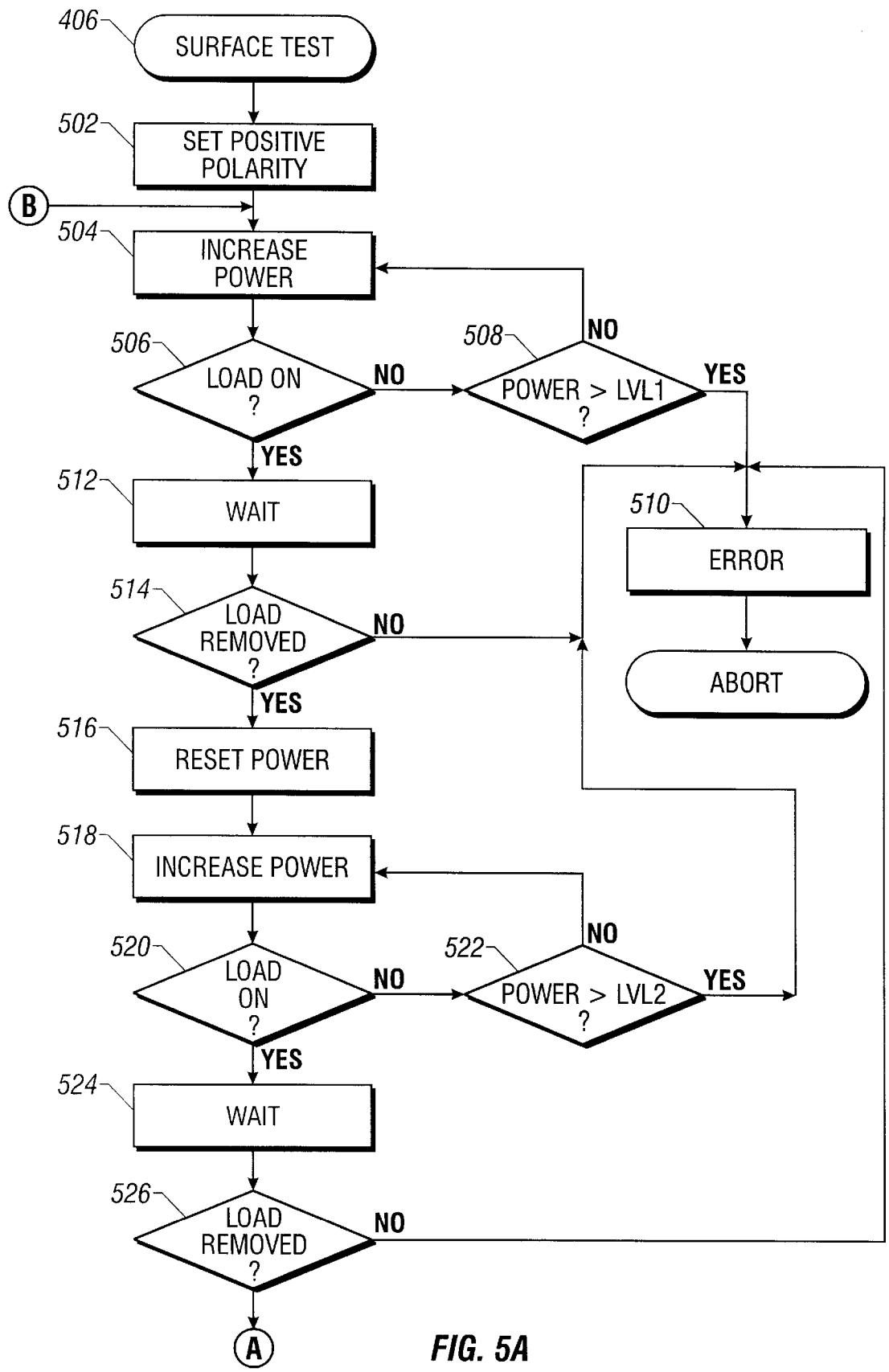
FIGS. 5A and 5B are a flow diagram of tasks performed by the tool arming application program in performing a surface test.
Figure 5B:
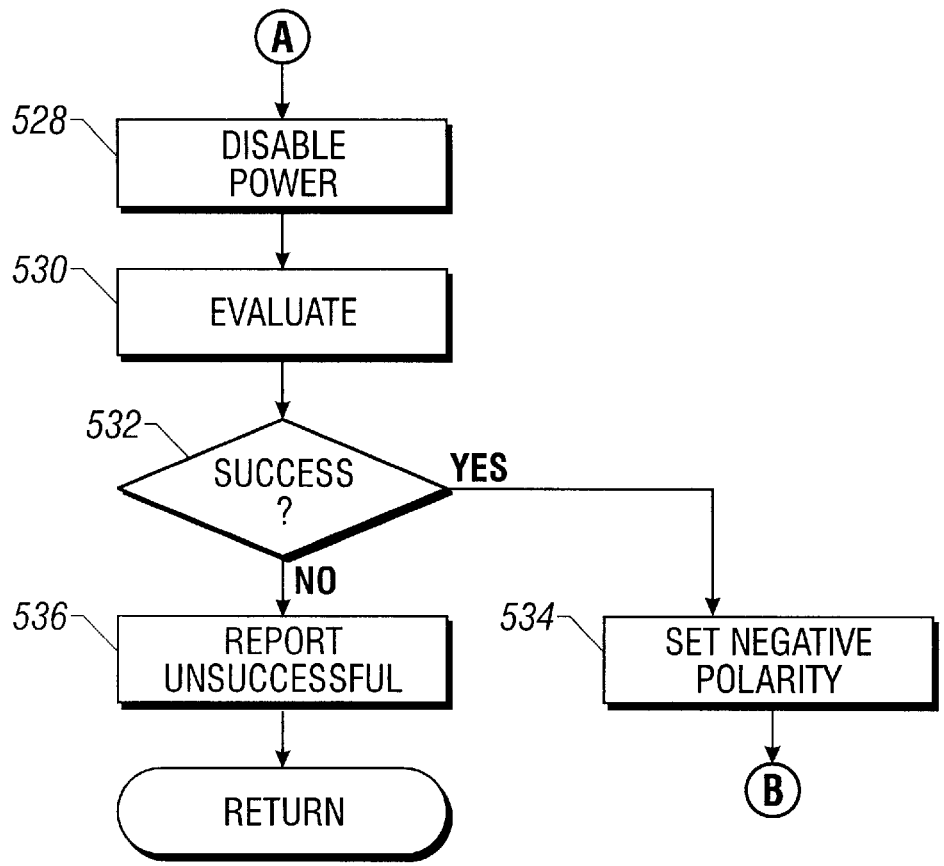

Referring to FIGS. 5A and 5B, the flow of the program 106 in performing the downhole tests is illustrated. The program 106 first sets (at 502) the polarity of the voltage applied at terminals P1 and P2 of the cable tester 250 to be positive. As shown in FIG. 3B, the cable tester 250 also includes a load resistor 306 that is regulated by a voltage switch 308 which closes when a predetermined positive voltage (P1 is positive with respect P2) is applied at Vcc, such as a voltage greater than about 145 V. When the switch 308 closes, the transistor 313 is turned on and current flows through the resistor 306 and an LED 310, which lights up. To perform negative polarity testing according to an embodiment, a voltage switch 314, transistor 321, load resistor 316, and LED 318 are used.

Next, the voltage Vcc applied to the cable tester 250 is increased (at 504). The program 106 then determines (at 506) if the load has turned on by monitoring the outputs provided by the signal sensor 230. If not, the program checks if the applied voltage is greater than a first predetermined voltage LVL1. If so, and the load has not turned on, then an error is reported (at 510) and the test is aborted.

If the load resistor 306 is connected, then the program 106 waits (at 512) until the voltage switch 308 re-opens (which can be set to last a predetermined amount of time such as one second). The program 106 then checks to determine if the load is removed (at 514). If so, the applied voltage is reset to its initial value (at 516) and the test is repeated again (as performed at 518, 520, and 522). After waiting for the applied voltage pulse to be over (at 524), the program 106 next checks to determine if the load has been removed (at 526). If not, an error is reported (at 510); otherwise, power is disabled (at 528) and the data is evaluated (at 530) to determine impedance values and if there are any current leaks. If the evaluation indicates a success (at 534), then the positive result is reported and the polarity between P1 and P2 is set negative (at 534) to perform negative polarity testing. If unsuccessful, the unsuccessful results are reported (at 536).

Figure 6:
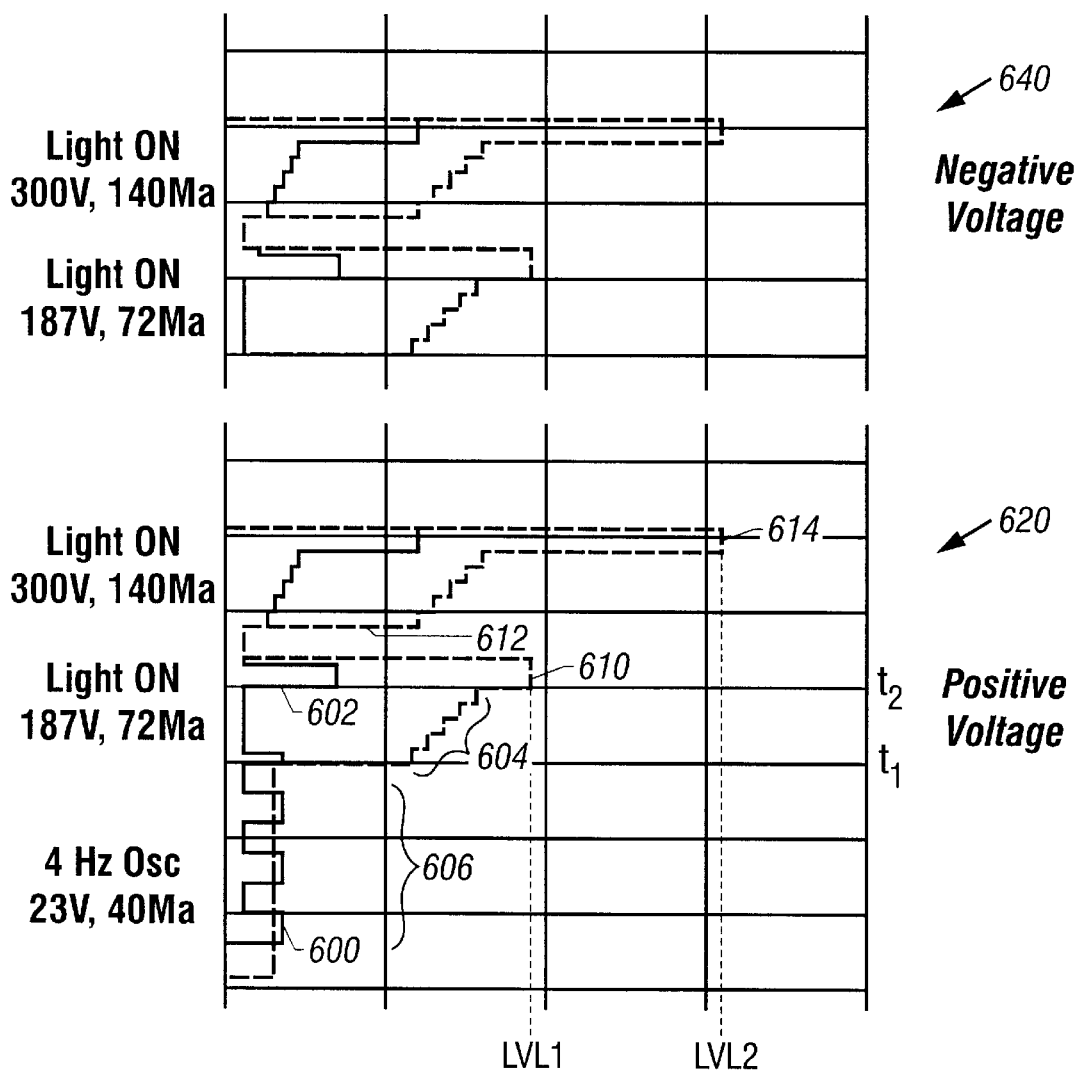
FIG. 6 is a timing diagram of cable current and voltage in the cable tester.

As illustrated in FIG. 6, the voltage applied (generally indicated as 610) to the cable tester 250 in the positive polarity test (620) is stepped up at time $t_1$, with incremental increases as indicated by 604 until the switch 308 closes and the current signal 600 steps up at time $t_2$. Before application of the voltage to a maximum of LVL1 at $t_1$, the current signal 600 in the electrical cable 26 oscillates at the frequency of the oscillator 300. Once the voltage switch 308 is closed, the known current load from the load resistor 306 is introduced into the cable 26. The current introduced into the cable 26 during this hot check can be measured and compared to the amount of current predicted in the cable 26 at that level of surface voltage. In one embodiment, the voltage switch 308 is closed for a predetermined amount of time (e.g., one second), at which time the cable current steps down, as indicated by 602. The test is repeated by again stepping the applied voltage signal, as indicated at 612, with the applied voltage increased to a high level (LVL2), which can be 300 VDC, for example, in the second test. The higher voltage LVL2 represents the activation voltage of a tool string (or firing voltage for a perforating string). A similar pattern is illustrated for the negative polarity test (640). Note, however, that with the negative polarity testing, the signature current signal is not present due to the reversed voltage polarity (the oscillator 300 is shut off).

Figure 7:
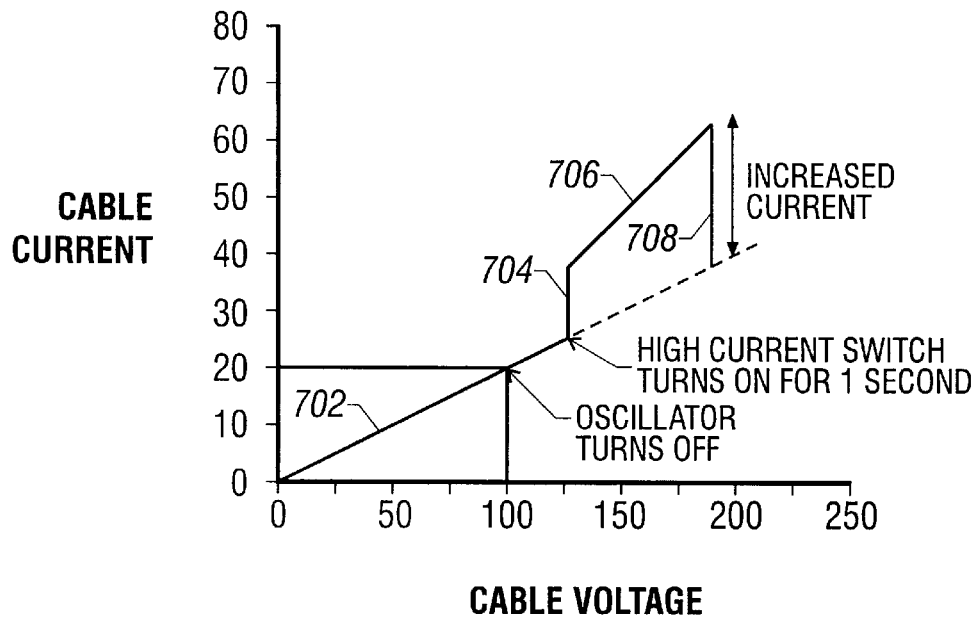
FIG. 7 is a graph of cable current as a function of applied cable voltage in the cable tester.

Referring further to FIG. 7, an impedance profile generated during an example hot check test is illustrated. In the illustrated impedance profile, cable current is plotted against applied voltage in the cable 26 over the course of the hot check test. A first slope 702 depicts the cable current profile (impedance or resistance to ground) prior to introduction of the load from the load resistor 306. Once the predetermined voltage is sufficient to close the voltage switch 308, the current from the load resistor 306 is introduced as a step function 704 which changes the impedance as evidenced by a second slope 706. In this example, the cable utilizes a CCL 36 which creates a known load or impedance on the cable 26, and such CCL impedance will generate a known impedance profile slope (within certain tolerances). If the first slope 706 is higher than the predicted slope for a cable 26, with a CCL, then the cable has leakage of current. If the first slope 702 is lower than the predicted slope, then there is a poor connection on the cable 26 causing resistance to increase and current to decrease. The same analysis applies to the evaluation of the impedance profile second slope 706 where the CCL load and the resistor loads are both known. However, in other embodiments, a CCL 36 might not be employed on a cable which may create the need to rely on the measurable load provided by the load resistor 260 in the cable tester 250.

Once the surface test has been performed and the cable 26 has been determined to have acceptable characteristics, the cable tester 250 may be removed and a tool string coupled to the electrical cable 26 for activation after the tool string is lowered downhole.

Referring back to FIG. 4, after re-connection of the tool string, the tool arming application program 106 next determines (at 416) if the operator has requested activation of the tool string. If not, power remains off to the tool string (at 408). If activation is requested, then the tool arming program 106 monitor predefined conditions, as listed above, to determine if activation is allowed. Activation is allowed (at 418) if the monitored conditions are satisfied.

The monitored conditions may include any one of or a combination of those listed above. Another value that may be monitored is an "integrated depth value," which is calculated from a number of parameters. One parameter is a depth increment derived from multiplying cable speed by time. The depth increment has a negative value if the cable 26 is moving up and a positive value if the cable is moving down. The depth increments, calculated at predetermined intervals (e.g., every N feet or T seconds), are summed to derive the total integrated depth, which is not allowed to go negative and is less than or equal to the actual cable depth. Thus, according to one example safety procedure, the application of activation power to the tool string is not allowed until the total integrated depth is at a sufficiently low depth, e.g., 200 ft.

In an alternative embodiment, for improved safety, the surface test 406 performed according to FIGS. 5A, 5B, 6 and 7 may be modified. Certain of the tasks may be skipped, such as the test involving application of a test voltage to the elevated level LVL2 (performed at 518, 520, and 522). In addition to reduce the amount of time in which a high voltage level (such as LVL1) is applied during the test, the step increases indicated as 604 in FIG. 6 may be removed and the applied high voltage duration may be limited to less than 500 milliseconds, for example. To further enhance safety, checks for the oscillating signal from the cable tester 250 may be performed several times during the surface test, including during a negative polarity test. This reduces the likelihood of inadvertent firing when the cable tester 250 is mistakenly replaced with a gun during a surface test. The voltage level LVL1 may also be kept below a reduced level, e.g., 200 V, for improved safety.

Other embodiments are also within the scope of the following claims. For example, safe activation of tools other than the perforating gun illustrated may be accomplished. Steps of the tool arming program may be modified but yet still achieve desirable results. In addition, the safety system may optionally be located at the well surface or it may be attached to the tool string and lowered downhole with the tool string.

While the present invention has been described with respect to a limited number of embodiments, those skilled in the art will appreciate numerous modifications and variations. It is intended that the appended claims cover all such modifications and variations as fall within the true spirit and scope of the present invention.

What is claimed is:

1. A test system, comprising:
    a test device that generates a signal having a predetermined characteristic; and
    a controller to detect the signal and enable performance of a test operation when the signal of the predetermined characteristic is present and disable performance of the test operation when the signal of the predetermined characteristic is not present.

2. The test system of claim 1, wherein the signal includes a signal having a predetermined frequency.

3. The test system of claim 1, further comprising an electrical cable, wherein the test device includes a cable tester electrically coupled to one end of the electrical cable.

4. The test system of claim 1, further comprising a current limiting device coupled to the electrical cable to limit the amount of current through the electrical cable.

5. The test system of claim 1, wherein the test device includes an oscillator to generate the signal.

6. The test system of claim 1, wherein the test device includes a code generator to produce a signature signal.

7. The test system of claim 1, wherein the test operation includes a surface test.

8. The test system of claim 7, wherein the test operation includes a cable test.

9. A safety system for use with an apparatus lowered into a well, comprising:
    a power supply;
    a controller that monitors at least one predefined condition relating to positioning of the apparatus in the well; and a switch that blocks power from the apparatus until the at least one predefined condition is present.

10. The safety system of claim 9, further comprising a computer, wherein the controller includes a program executable in the computer.

11. The safety system of claim 9, wherein the predefined condition includes a depth of the apparatus in the well.

12. The safety system of claim 9, wherein the predefined condition includes direction of the apparatus traveling in the well.

13. The safety system of claim 9, wherein the predefined condition includes the speed of the apparatus traveling in the well.

14. The safety system of claim 9, wherein the predefined condition includes an integrated depth value associated with the apparatus.

15. The safety system of claim 14, wherein the integrated depth value is calculated based on speed of the apparatus.

16. The safety system of claim 9, wherein the apparatus includes a perforating gun.

17. The safety system of claim 9, further comprising a computer, wherein the switch is implemented in software executable on the computer.

18. A method of safely operating an apparatus used in a well, comprising:

monitoring at least one parameter related to positioning of the apparatus in the well;

blocking activation power from the apparatus while the parameter is in a first condition; and applying activation power to the apparatus when the parameter is in a second condition.

19. The method of claim 18, wherein the parameter includes a depth of the apparatus in the well.

20. The method of claim 18, wherein the parameter includes a speed of the apparatus traveling in the well.

21. The method of claim 18, wherein the parameter includes an integrated depth of the apparatus.

22. The method of claim 21, wherein the integrated depth is calculated based on a speed of the apparatus traveling in the well.

23. The method of claim 22, wherein the integrated depth is further calculated based on a direction of the apparatus traveling in the well.

* * * * *